US009009650B2

(12) United States Patent
Chen et al.

(10) Patent No.: US 9,009,650 B2
(45) Date of Patent: *Apr. 14, 2015

(54) GENERATING A SEMANTIC GRAPH THAT ALLOWS A USER TO INTELLIGENTLY AND EFFICIENTLY CONNECT WITH PEOPLE AND ASSETS INVOLVED IN PROJECTS

(71) Applicant: International Business Machines Corporation, Armonk, NY (US)

(72) Inventors: Feng-wei Chen, Cary, NC (US); William T. Pack, Apex, NC (US); Paul R. Sappie, Cary, NC (US); Tintin S. Soemargono, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,805

(22) Filed: Apr. 30, 2013

(65) Prior Publication Data

US 2013/0254739 A1    Sep. 26, 2013

Related U.S. Application Data

(63) Continuation of application No. 13/426,117, filed on Mar. 21, 2012.

(51) Int. Cl.
*G06F 9/44* (2006.01)
*G06Q 10/06* (2012.01)

(52) U.S. Cl.
CPC ............ *G06F 8/70* (2013.01); *G06Q 10/067* (2013.01)

(58) Field of Classification Search
CPC ............ G06F 17/30961; G06F 17/30958; G06F 17/30625; G06F 8/20
See application file for complete search history.

(56) References Cited

U.S. PATENT DOCUMENTS

| 6,904,588 | B2 * | 6/2005 | Reddy et al. ............... 717/104 |
| 6,918,124 | B1 * | 7/2005 | Novik et al. ............... 719/318 |
| 7,216,088 | B1 | 5/2007 | Chappel et al. |
| 7,305,392 | B1 | 12/2007 | Abrams et al. |

(Continued)

OTHER PUBLICATIONS

Charles Rich et al.; Recognizing a program's design A graph-parsing approach; 1990 IEEE; pp. 82-89; <http://ieeexplore.ieee.org/stamp/stamp.jsp?tp=&arnumber=43053>.*

(Continued)

*Primary Examiner* — Thuy Dao
*Assistant Examiner* — Cuong V Luu
(74) *Attorney, Agent, or Firm* — Robert A. Voigt, Jr.; Winstead, P.C.

(57) ABSTRACT

A method, system and computer program product for intelligently and efficiently connecting with people and assets involved in projects. Semantic graphs for different projects or different versions of the same project are generated based on resources (e.g., templates, documents) within these projects or versions of the same project. Each semantic graph builds a relationship among the entities (e.g., development processes) of the particular project in question. The differences between these semantic graphs is illustrated in a single unified semantic graph. The single unified semantic graph highlights the different entities that were used in these projects as well as highlights the different personnel assigned to the same entities in these projects or versions of the same project. In this manner, a user is able to quickly identify the difference processes and personnel involved in the different projects or different versions of the same project.

8 Claims, 9 Drawing Sheets

(56) References Cited

U.S. PATENT DOCUMENTS

| | | | |
|---|---|---|---|
| 7,549,309 B2* | 6/2009 | Beringer et al. | 70/102 |
| 7,743,360 B2* | 6/2010 | Venolia | 717/103 |
| 8,386,910 B2* | 2/2013 | Abe et al. | 715/200 |
| 2003/0084424 A1* | 5/2003 | Reddy et al. | 717/105 |
| 2003/0233268 A1 | 12/2003 | Taqbeem et al. | |
| 2005/0039163 A1* | 2/2005 | Barrett et al. | 717/105 |
| 2006/0010418 A1* | 1/2006 | Gupta et al. | 717/101 |
| 2007/0011649 A1* | 1/2007 | Venolia | 717/101 |
| 2007/0129976 A1 | 6/2007 | Hochberg et al. | |
| 2009/0259985 A1* | 10/2009 | Knutson et al. | 717/101 |
| 2010/0146382 A1* | 6/2010 | Abe et al. | 715/234 |
| 2010/0211924 A1* | 8/2010 | Begel et al. | 717/101 |
| 2011/0078166 A1* | 3/2011 | Oliver et al. | 707/760 |
| 2012/0221998 A1* | 8/2012 | Rowley et al. | 717/105 |

OTHER PUBLICATIONS

Taghi M. Khoshgoftaar et al.; Classification Tree Models of Software Quality Over Multiple Releases; 1999 IEEE; 10 pages; <http://ieeexplore.ieee.org/stamp/stamp.jsp?tp=&arnumber=809316>.*

Gabriele Taentzer; AGG A Graph Transformation Environment for Modeling and Validation of Software; 2004 springer; pp. 446-453; <http://link.springer.com/chapter/10.1007/978-3-540-25959-6_35>.*

Tobias Sager; Detecting similar Java classes using tree algorithms; 2006 ACM; pp. 65-71; <http://dl.acm.org/citation.cfm?id=1138000>.*

Andy Schurr; Progress a VHL language based on grap grammars; 2005 Springer; pp. 641-659; <http://link.springer.com/chapter/10.1007/BFb0017419>.*

R. W. Schwanke et al.; Discovering, visualizing, and controlling software structure; 1989 ACM; pp. 147-154; <http://dl.acm.org/citation.cfm?id=75223>.*

Office Action for U.S. Appl. No. 13/426,117 dated Feb. 20, 2014, pp. 1-24.

Office Action for U.S. Appl. No. 13/426,117 dated Jul. 2, 2014, pp. 1-21.

Rich et al., "Recognizing a Program's Design: A Graph-Parsing Approach," 1990 IEEE, pp. 82-89, <http://ieeexplore.ieee.org/stamp/stamp.jsp?tp=&arnumber=43053>.

Khoshgoftaar et al., "Classification Tree Models of Software Quality Over Multiple Releases," 1999 IEEE, 10 pages, <http://ieeexplore.ieee.org/stamp/stamp.jsp?tp=&arnu mber=809316>.

Gabriele Taentzer, "AGG: A Graph Transformation Environment for Modeling and Validation of Software," 2004 Springer; pp. 446-453, <http://link.springer.com/chapter/1 0.1 007/978-3-540-25959-6_35>.

R. W. Schwanke, "Discovering, Visualizing, and Controlling Software Structure," 1989 ACM, pp. 147-150, <http:/ /dl.acm.org/citation .cfm ?id= 75223>.

Sager et al., "Detecting Similar Java Classes Using Tree Algorithms," 2006 ACM, pp. 65-71, <http://dl.acm.org/citation.cfm?id=1138000>.

McCreary et al., "Using Graph Parsing for Automatic Graph Drawing," 1998 IEEE, pp. 545-561, <http:/ /ieeexp lore.ieee. org/stamp/stamp .jsp ?tp=&arn umber= 709599>.

* cited by examiner

GENERATING A SEMANTIC GRAPH THAT ALLOWS A USER TO INTELLIGENTLY AND EFFICIENTLY CONNECT WITH PEOPLE AND ASSETS INVOLVED IN PROJECTS

CROSS-REFERENCE TO RELATED APPLICATIONS

The present application is a continuation application of pending U.S. patent application Ser. No. 13/426,117, which was filed on Mar. 21, 2012, which is assigned to the assignee of the present invention. The present application claims priority benefits to U.S. patent application Ser. No. 13/426,117.

TECHNICAL FIELD

The present invention relates to project management, and more particularly to generating a semantic graph that allows a user to intelligently and efficiently connect with people and assets involved in projects.

BACKGROUND

Today's workplace is extremely dynamic, both in terms of project content and project personnel. Companies are continually innovating with new products and services to respond to changes in the market. At the same time, employees have been willing to change jobs and assignments to seek out new opportunities as well as to learn new skills, seek out new challenges and expand their current skill sets. As a result, project content and project personnel are continually changing.

Currently, as employees transition between projects, it may be desirable for the employees to access the assets (e.g., documents, design notes) of related projects (e.g., prior versions of the project the employee is assigned) as well to communicate with personnel who worked on those related projects in order to gain a better understanding of the assigned project. As a result of gaining a better understanding of the assigned project, the employees should be more productive on generating product deliverables.

Unfortunately, such information (e.g., project assets, listing of personnel) is stored in various formats (e.g., database system, file system, blogs, wikis, project websites, e-mails, etc.) in databases located at geographically different locations and is accessed statically by the user. The user will have to spend a great amount of time in searching the database(s) to determine what information is stored about a particular project, and whether such information about the project is applicable to the user's needs. Such a process is inefficient and time consuming and not effective in delivering the desired information.

BRIEF SUMMARY

In one embodiment of the present invention, a method for intelligently and efficiently connecting with people and assets involved in projects comprises generating a first semantic graph for a first project based on resources within the first project, where the first semantic graph builds a relationship among entities of the first project. The method further comprises generating a second semantic graph for a second project based on resources within the second project, where the second semantic graph builds a relationship among entities of the second project, and where the second project is a different project from the first project or a different version of the first project. The method additionally comprises receiving a selection of the first and second semantic graphs representing different projects or versions of a same project. In addition, the method comprises comparing and merging differences between the first and second semantic graphs. Furthermore, the method comprises generating, by a processor, a third semantic graph that illustrates the differences between the first and second semantic graphs, where the third semantic graph comprises nodes representing the entities of the first and second projects, and where the differences comprise one or more of the following: personnel and development processes.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for intelligently and efficiently connecting with people and assets involved in projects. In one embodiment of the present invention, semantic graphs for different projects or different versions of the same project are generated based on resources (e.g., templates, documents) within these projects or versions of the same project. Each semantic graph builds a relationship among the entities (e.g., development process of the project, such as the development control plan, the function verification test, etc.) of the particular project in question. The differences between these semantic graphs may be illustrated in a single unified semantic graph by comparing and merging the differences between these semantic graphs. The single unified semantic graph may highlight the different entities (e.g., processes) that were used in these projects as well as highlight the different personnel assigned to the same entities in these projects or versions of the same project. In this manner, a user is able to quickly identify the difference processes and personnel involved in the different projects or different versions of the same project. Additionally, the semantic graph provides the capability of allowing the user to contact personnel identified with these entities via various social communication channels or communities as well as the capability of allowing the user to retrieve/post documents associated with these entities via various communication channels and asset repositories. In this manner, the user is able to efficiently communicate with appropriate personnel as well as retrieve/post documents of interest.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
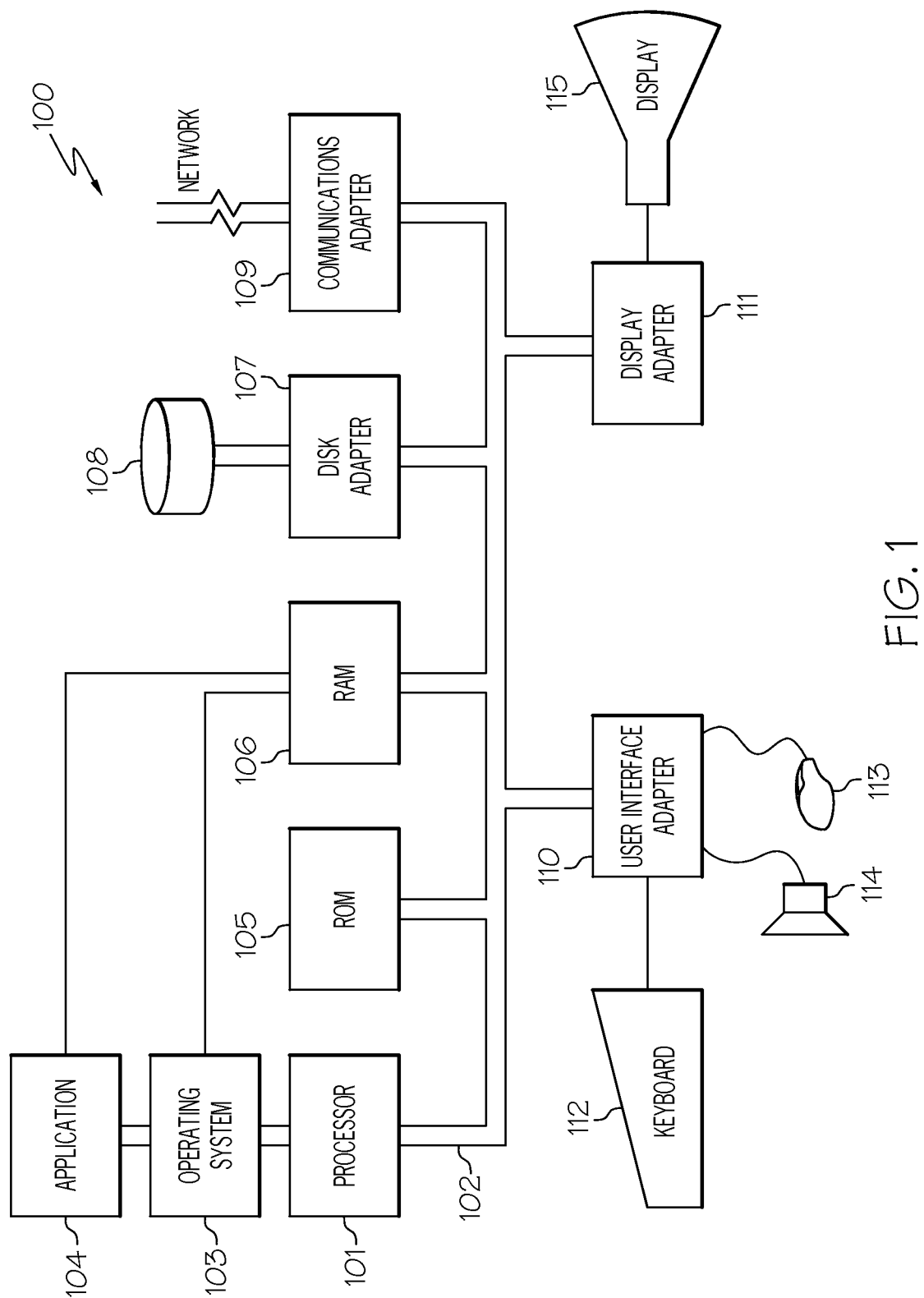
FIG. 1 illustrates a hardware configuration of a computer system configured in accordance with an embodiment of the present invention.

Referring now to the Figures in detail, FIG. 1 illustrates a hardware configuration of a computer system 100 which is representative of a hardware environment for practicing the present invention. Computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for intelligently and efficiently connecting with people and assets involved in projects as discussed further below in association with FIGS. 2, 3A-3B, 4A-4B and 5-7.

Referring again to FIG. 1, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for intelligently and efficiently connecting with people and assets involved in projects, as discussed further below in association with FIGS. 2, 3A-3B, 4A-4B and 5-7, may reside in disk unit 108 or in application 104.

Computer system 100 may further include a communications adapter 109 coupled to bus 102. Communications adapter 109 interconnects bus 102 with an outside network thereby enabling computer system 100 to communicate with other such systems as well as access a database (not shown) configured to store templates, documents, etc., pertaining to various projects.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, as employees transition between projects, it may be desirable for the employees to access the assets (e.g., documents, design notes) of related projects (e.g., prior versions of the project the employee is assigned) as well to communicate with personnel who worked on those related projects in order to gain a better understanding of the assigned project. As a result of gaining a better understanding of the assigned project, the employees should be more productive on generating product deliverables. Unfortunately, such information (e.g., project assets, listing of personnel) is stored in various formats (e.g., database system, file system, blogs, wikis, project websites, e-mails, etc.) in databases located at geographically different locations and is accessed statically by the user. The user will have to spend a great amount of time in searching the database(s) to determine what information is stored about a particular project, and whether such information about the project is applicable to the user's needs. Such a process is inefficient and time consuming and not effective in delivering the desired information.

Figure 2:
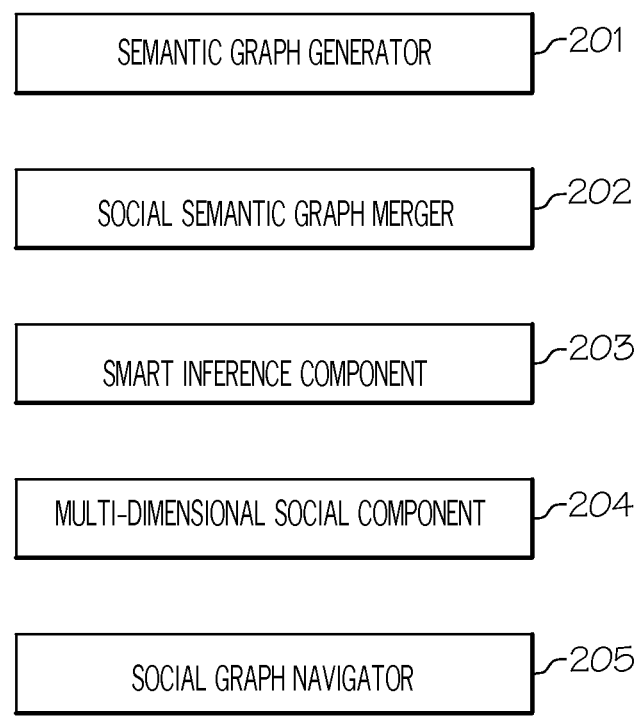
FIG. 2 illustrates the software components used in intelligently and efficiently connecting people and assets involved in projects via the use of semantic graphs.
Figure 3A:
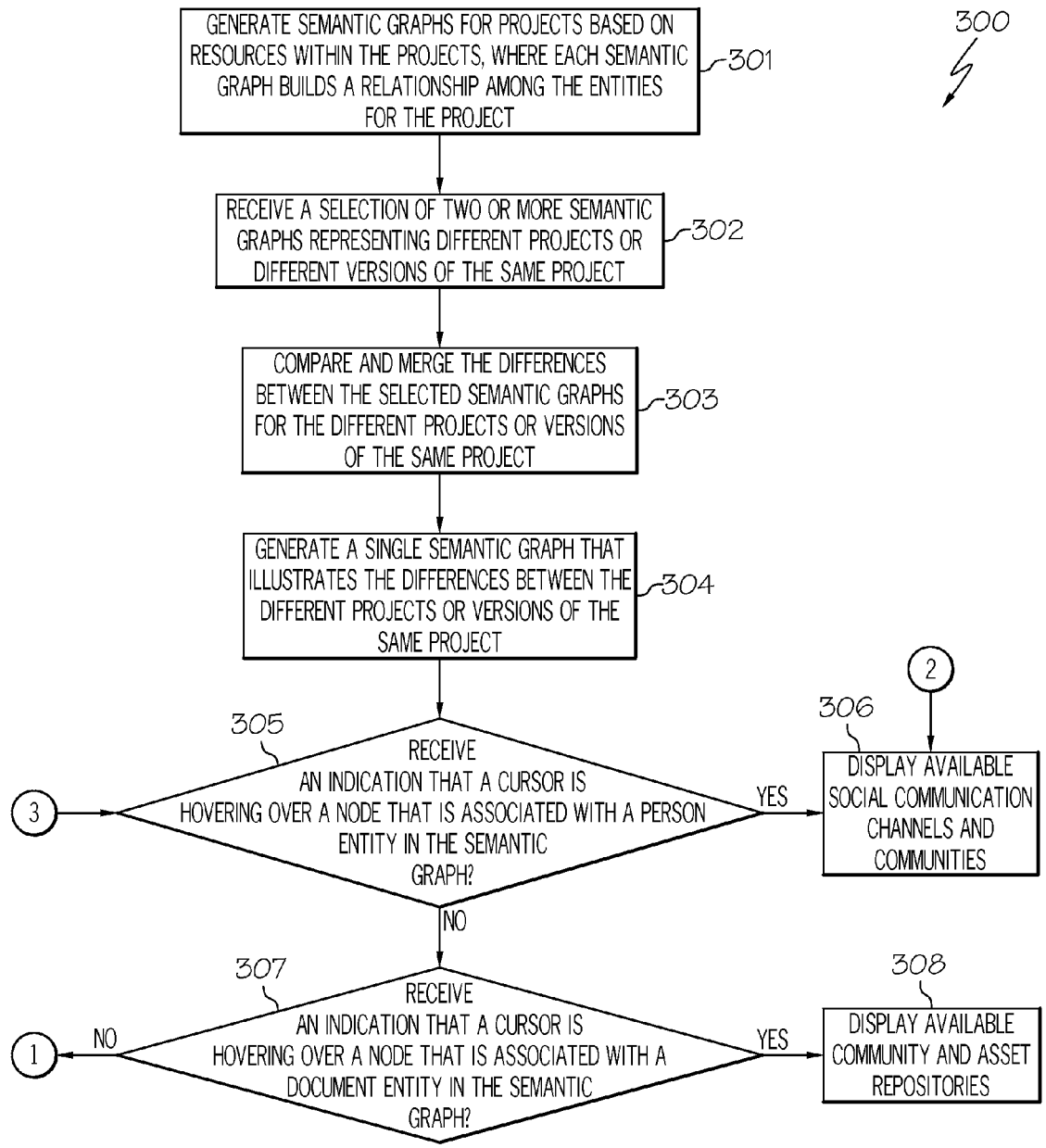
FIGS. 3A-3B are a flowchart of a method for intelligently and efficiently connecting people and assets involved in projects via the use of semantic graphs in accordance with an embodiment of the present invention.
Figure 3B:
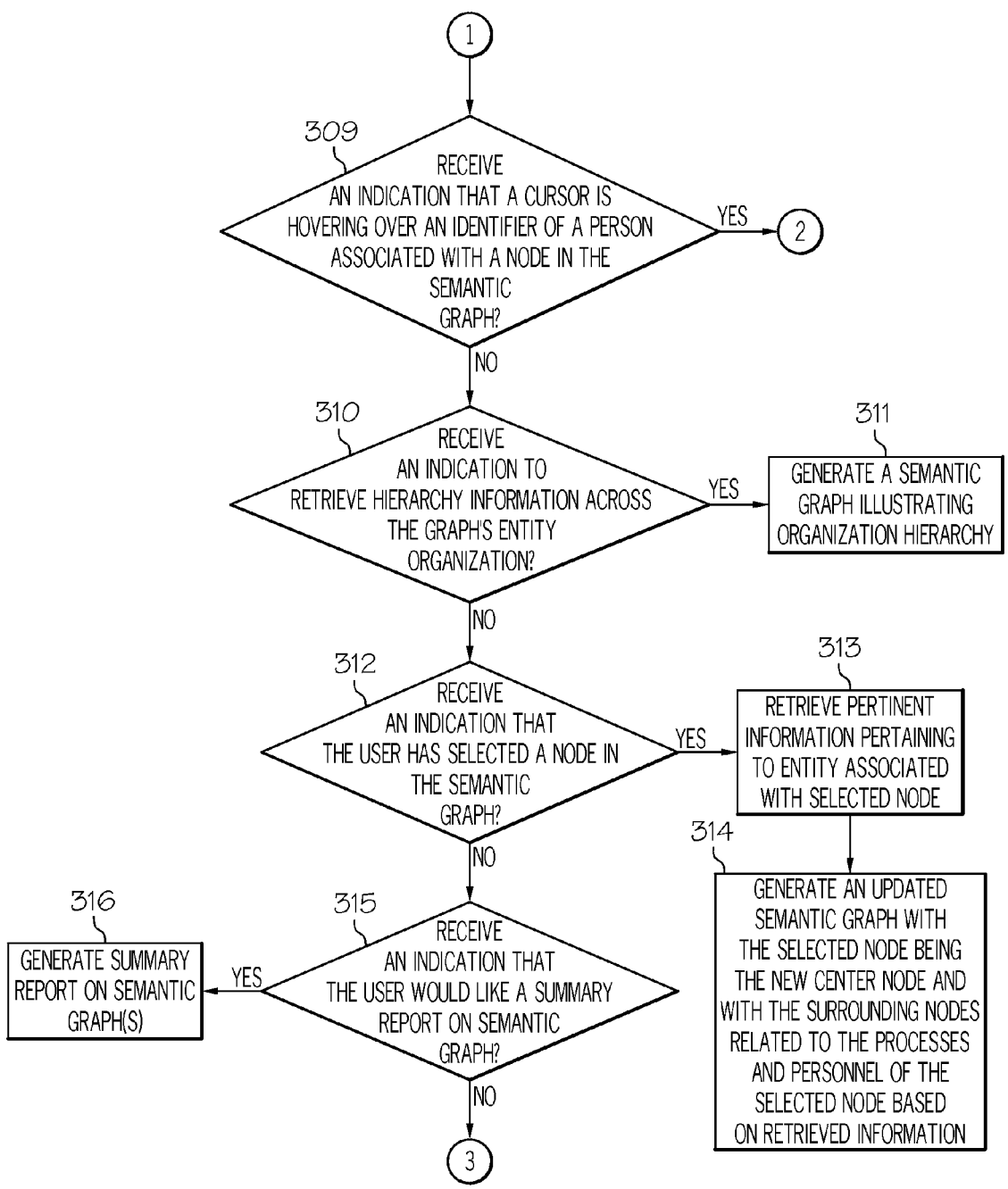
Figure 4A:
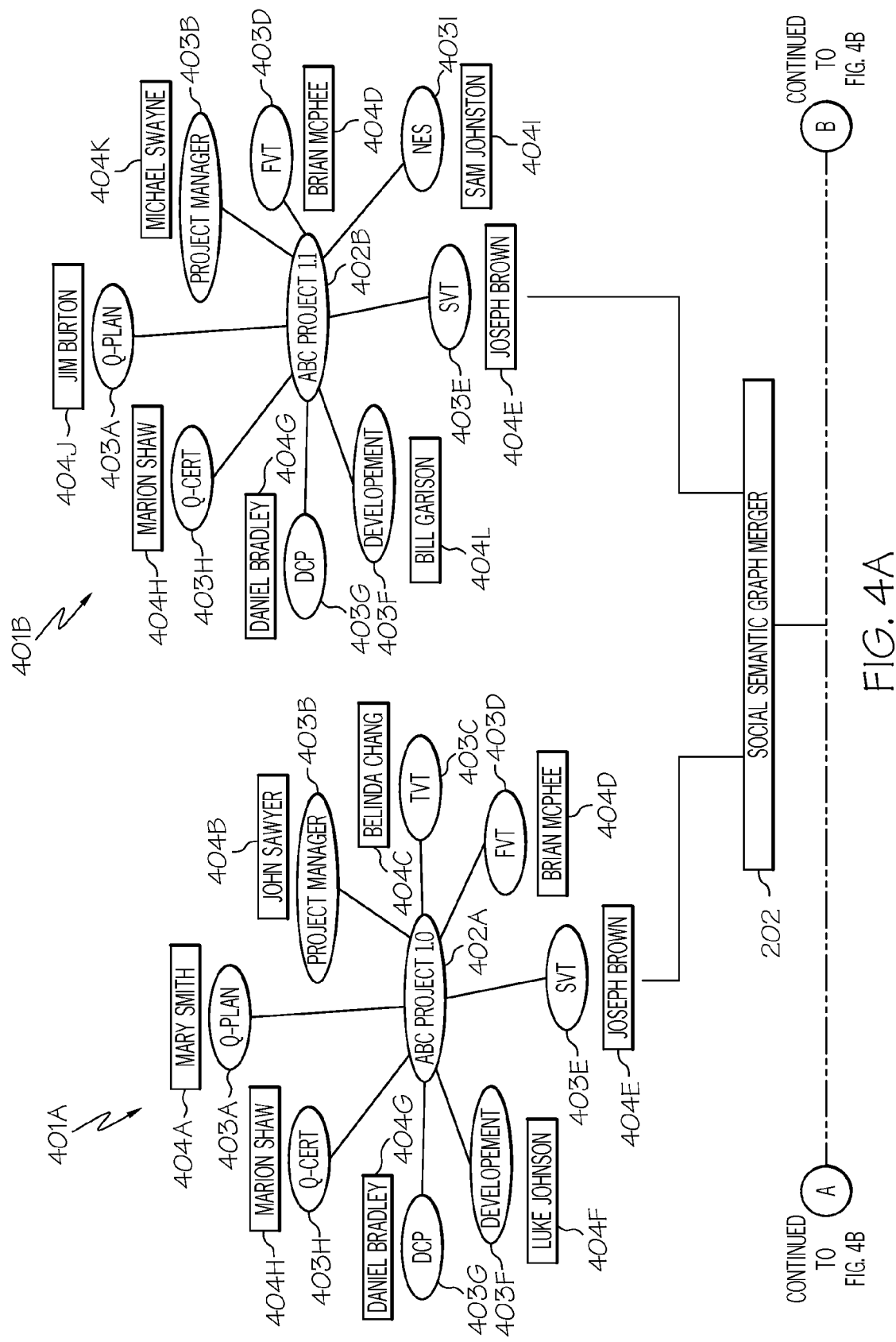
FIGS. 4A-4B illustrate comparing and merging the differences between two semantic graphs into a single semantic graph in accordance with an embodiment of the present invention.
Figure 4B:
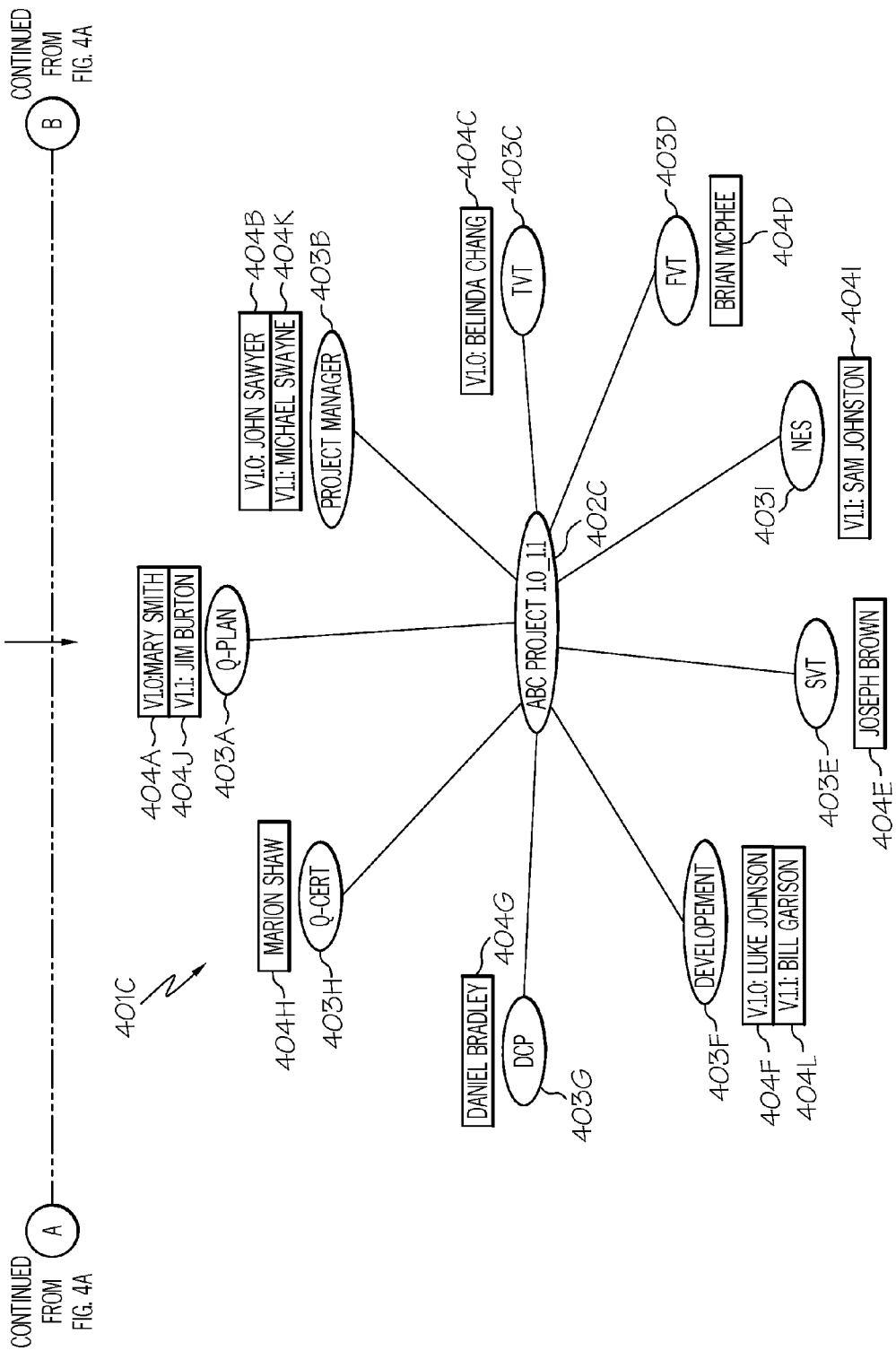
Figure 5:
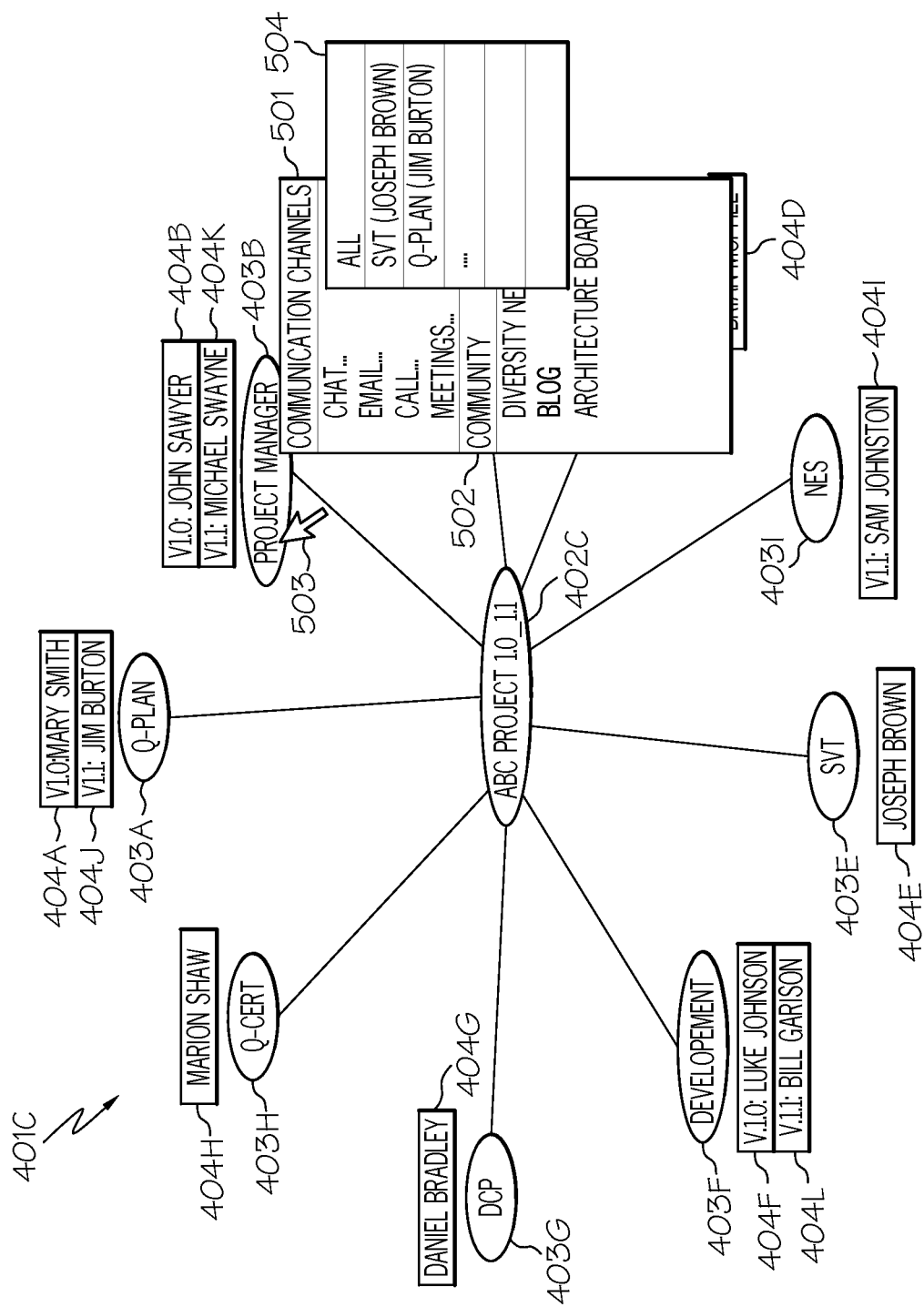
FIG. 5 illustrates displaying available communication channels and social communities in response to receiving an indication that a cursor is hovering over a node in the semantic graph that is associated with a person entity in accordance with an embodiment of the present invention.
Figure 6:
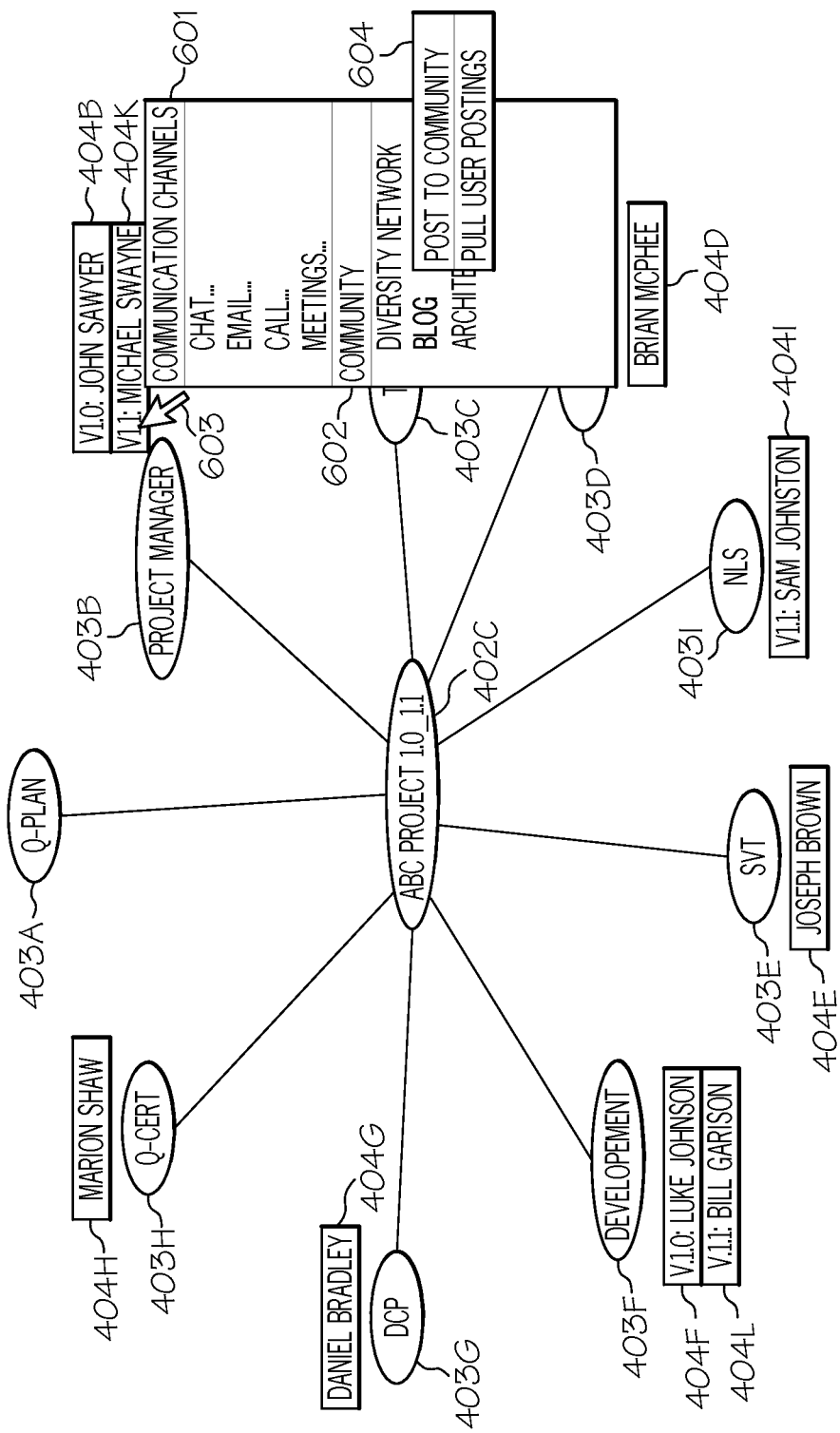
FIG. 6 illustrates displaying available communication channels and social communities in response to receiving an indication that a cursor is hovering over an identifier of a person associated with a node in the semantic graph in accordance with an embodiment of the present invention.
Figure 7:
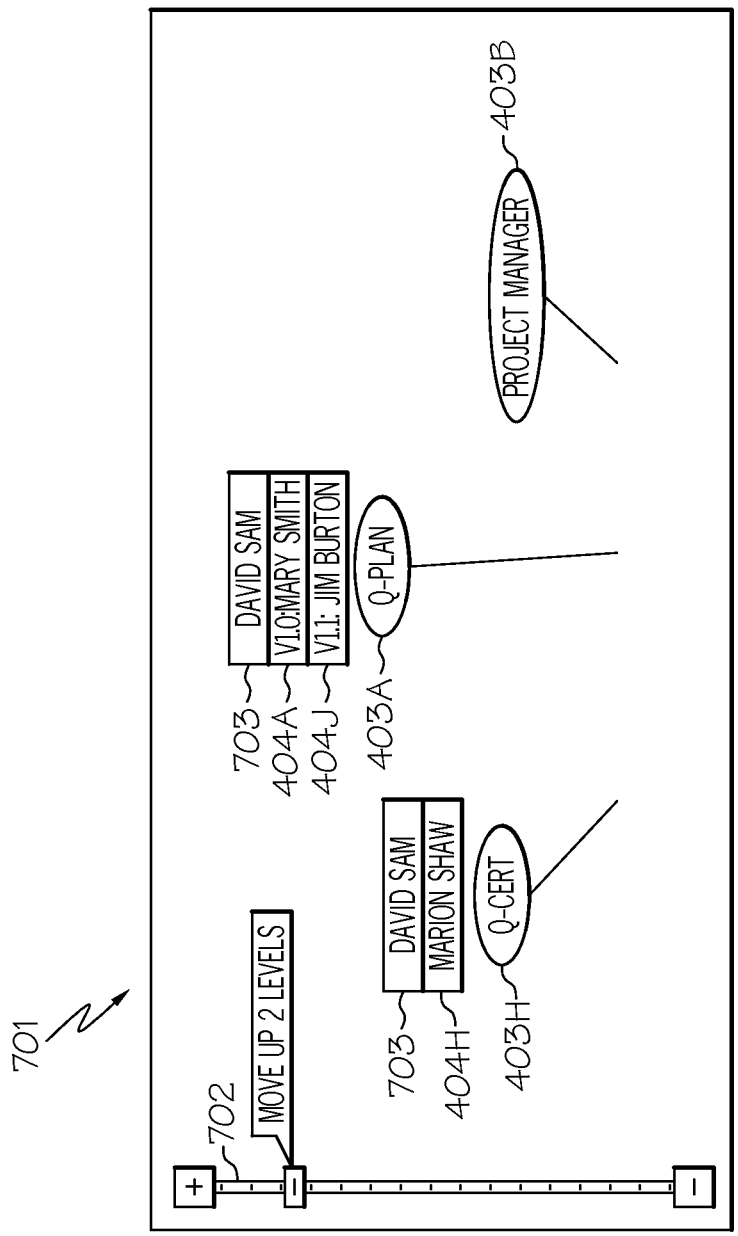
FIG. 7 illustrates retrieving hierarchical information concerning the personnel depicted in the semantic graph in accordance with an embodiment of the present invention.

The principles of the present invention provide a means for intelligently and efficiently connecting people and assets involved in projects thereby saving the user time in gathering information about the project to assist the user's needs as discussed further below in connection with FIGS. 2, 3A-3B, 4A-4B and 5-7. In one embodiment, such information is graphically displayed to the user using what is referred to as "semantic graphs," which refer to graphs that illustrate personnel and/or development processes (processes used in the development of the project) involved in a project (or differences between projects) (or the development processes and/or personnel involved in a particular development process for the project(s)) based on templates and natural language processing technology as discussed further below in connection with FIGS. 2, 3A-3B, 4A-4B and 5-7. FIG. 2 illustrates the software components used in intelligently and efficiently connecting people and assets involved in projects via the use of semantic graphs. FIGS. 3A-3B are a flowchart of a method for intelligently and efficiently connecting people and assets involved in projects via the use of semantic graphs. FIGS. 4A-4B illustrate comparing and merging the differences between two semantic graphics into a single semantic graph. FIG. 5 illustrates displaying available communication channels and social communities in response to receiving an indication that a cursor is hovering over a node in the semantic graph that is associated with a person entity. FIG. 6 illustrates displaying available communication channels and social communities in response to receiving an indication that a cursor is hovering over an identifier of a person associated with a node in the semantic graph. FIG. 7 illustrates retrieving hierarchical information concerning the personnel depicted in the semantic graph.

Referring now to FIG. 2, as stated above, FIG. 2 is a diagram of the software components used in intelligently and efficiently connecting people and assets involved in projects via the use of semantic graphs in accordance with an embodiment of the present invention. In one embodiment, these software components may reside in application 104 (FIG. 1).

The following provides a brief description of these software components. A more detailed description of these software components is provided below in conjunction with FIGS. 3A-3B, where their functionalities are discussed in connection with the method for intelligently and efficiently connecting people and assets involved in projects via the use of semantic graphs.

The software components include a semantic graph generator 201 configured to generate semantic graphs based on templates and natural language processing technology. In one embodiment, semantic graph generator 201 uses templates, documents and any resource linkage within a project to build an interactive semantic graph that has entity type awareness. The semantic graphic may includes nodes, where each node represents an entity, where an entity may consist of personnel involved in the project (e.g., project manager) and/or processes for developing the project (e.g., function verification test, system verification test, decision check point, development). The type of the entity may be classified as a "person entity" (e.g., entity associated with a particular individual) or a "document entity" (e.g., entity associated with a document).

The software components further include a social semantic graph merger 202 configured to compare and merge the differences between semantic graphs into a single unified semantic graph. In one embodiment, social semantic graph merger 202 compares the metadata associated with each of the nodes in the compared semantic graphs to identify variations between the semantic graphs.

Additionally, the software components include a smart inference component 203 configured to recognize all available entities and their types and dynamically build a smart action list based on the surround type of the entities. For example, a node representing a person entity may have social communication capability; whereas, a node representing a document entity may have community or asset repository capability. If smart inference component 203 determines that the node represents a person entity, then smart inference component 203 may generate a list of the different types of available social communications (e.g., e-mail, telephone) as well as with which particular individuals. Similarly, if smart inference component 203 determines that the node represents a document entity, then smart inference component 203 may generate a list of the different types of available communities or asset repositories as well as with which particular individuals (e.g., e-mail document owner, post document to community, share document with colleagues in project).

A multi-dimensional social component 204 is configured to display the available communication channels (e.g., e-mail, telephone, meetings, online chat) and social communities (e.g., network groups, blogs, boards) in response to a cursor hovering over a node in the semantic graph for a node that represents a person entity. Furthermore, multi-dimensional social component 204 is configured to display available community and asset repositories (e.g., e-mail document owner, telephone document owner, meetings with document owner, post document to a community, share document with other personnel involved in project) in response to a cursor hovering over a node in the semantic graph for a node that represents a document entity.

Additionally, the software components include a social graph navigator 205 configured to provide the functionality that allows a user to select a node (representing a personnel or process) in the semantic graph thereby causing an updated semantic graph to be generated that focuses on the selected node. The updated semantic graph includes nodes surrounding the selected node whereby the surrounding nodes represent personnel and development processes concerning the selected node. Development processes refer to the processes used in the development of a project, and such processes are not to be limited in scope to any particular industry, such as the information technology industry. In this manner, the user is able to retrieve the necessary information that focuses on a particular project asset (e.g., functional verification test process used in the development process). For example, if the user selected the node that represents the functional verification test process used in the development process, then an updated graph may be generated that includes nodes directed to who is responsible for the functional verification test process, test results, defects, overall functional verification test progress, etc. that surround the selected node (representing the functional verification test process). The user may then be able to obtain information pertaining to the selected node by extracting information from each of the surrounding nodes.

As stated above, a more detailed description of the functionality of these software components is provided below in connection with FIGS. 3A-3B.

FIGS. 3A-3B are a flowchart of a method for intelligently and efficiently connecting people and assets involved in projects via the use of semantic graphs in accordance with an embodiment of the present invention.

Referring to FIG. 3A, in conjunction with FIGS. 1-2, semantic graph generator 201 generates semantic graphs for projects based on resources (e.g., templates, documents) within the projects, where each semantic graph builds a relationship among the entities for the project. In one embodiment, such resources may be stored in databases coupled to computer system 100. For example, a project may consist of various processes (e.g., development control plan, function verification test, system verification test, certifications, etc.) and managers (e.g., project manager) involved in the development of the project. Such processes may reflect a product development cycle which is captured in a template. Semantic graph generator 201 may be configured to identify the necessary documents based on the template and build the semantic graph that graphically represents relationships among entities for the project. In one embodiment, the semantic graph may include nodes, where each node represents an entity, where an entity refers to a process or personnel involved in the development of the project. The type of the entity may be classified as a person entity or a document entity. A person entity refers to an entity that corresponds to an individual; whereas, a document entity refers to an entity that corresponds to a document. In one embodiment, semantic graph generator 201 may further use natural language processing technology to infer relationships among the entities from sentences in documents. An illustration of semantic graphs that may be generated by semantic graph generator 201 is shown in FIG. 4A.

Referring to FIG. 4A, FIG. 4A illustrates two semantic graphs 401A, 401B created by semantic graph generator 201 in accordance with an embodiment of the present invention. Semantic graph 401A is a semantic graph generated for the project identified as "ABC Project 1.0;" whereas, semantic graph 401B is a semantic graph generated for the project identified as "ABC Project 1.1," which is the next version of the ABC Project 1.0. Semantic graph 401A has as its center node, a node 402A representing ABC Project 1.0. Semantic graph 401B has as its center node, a node 402B representing ABC Project 1.1. Semantic graph 401A includes nodes representing the relationship among the entities for ABC Project 1.0. For example, semantic graph 401A includes nodes 403A (Quality-plan or "Q-plan"), 403B (project manager), 403C (Translation Verification Test (TVT)), 403D (Function Verification Test (FVT)), 403E (System Verification Test (SVT)), 403F (development), 403G (Development Control Plan (DCP)) and 403H (Quality-certification or "Q-cert"). Each node 403A-403H represents a process or manager involved in the development of the project (ABC Project 1.0). Each node 403A-403H may be associated with metadata that identifies the personnel associated with that entity (e.g., process, manager). For example, Mary Smith 404A is the person identified with Q-plan 403A. John Sawyer 404B is the person identified with project manager 403B. Belinda Chang 404C is the person identified with TVT 403C. Brian McPhee 404D is the person identified with FVT 403D. Joseph Brown 404E is the person identified with SVT 403E. Luke Johnson 404F is the person identified with development 403F. Daniel Bradley 404G is the person identified with DCP 403G. Marion Shaw 404H is the person identified with Q-cert 403H.

Similarly, semantic graph 401B includes the same nodes as semantic graph 401A except that it additionally includes node 403I representing the National Language Support (NLS), which is a process involved in the project (ABC Project 1.1). Sam Johnston 404I is the person identified with NLS 403I. Also, as illustrated in semantic graph 401B, the ABC Project 1.1 does not include the Translation Verification Test (TVT) (node 403C). Furthermore, semantic graph 401B illustrates that the ABC Project 1.1 has assigned different personnel to the same processes as involved in the ABC Project 1.0. For example, Jim Burton 404J is assigned to Q-plan 403A; Michael Swayne 404K is assigned to project manager 403B; and Bill Garison 404L is assigned to development 403F. These differences will be captured and displayed in a single unified semantic graph by social semantic graph merger 202 as discussed further below.

Nodes 403A-403I may collectively or individually be referred to as nodes 403 or node 403, respectively. Personnel (or "identifiers" of personnel) 404A-404L may collectively or individually be referred to as personnel 404 or personnel 404, respectively.

Returning to FIG. 3A, in conjunction with FIGS. 1-2, in step 302, computer system 100 receives a selection of two or more semantic graphs (e.g., semantic graphs 401A, 401B) representing different projects or different versions of the same project (e.g., ABC Project 1.0 and ABC Project 1.1).

In step 303, social semantic graph merger 202 compares and merges the differences between the semantic graphs (e.g., semantic graphs 401A, 401B) selected by the user in step 302.

In step 304, social semantic graph merger 202 generates a single unified semantic graph that illustrates the differences between the semantic graphs (e.g., semantic graphs 401A, 401B) selected by the user in step 302. For example, referring to FIG. 4B, FIG. 4B further illustrates comparing and merging the differences between two semantic graphics (semantic graphs 401A, 401B) into a single semantic graph (semantic graph 401C) in accordance with an embodiment of the present invention.

As illustrated in FIG. 4B, Semantic graph 401C has as its center node, a node 402C (identified as "ABC Project 1.0_1.1"), representing that semantic graph 401C illustrates the difference between the versions of the same project (ABC Project 1.0 and ABC Project 1.1). Semantic graph 401C includes all of the nodes 403 (representing the processes and managers involved in the selected projects), as well as all the individuals 404 assigned to these entities represented by nodes 403. Semantic graph 401C highlights the different personnel 404 assigned to an entity represented by a node 403. For example, Mary Smith 404A is assigned to Q-plan 403 for the ABC Project 1.0; whereas, Jim Burton 404J is assigned to Q-plan 403 for the ABC Project 1.1. In another example, John Sawyer 404B is assigned as the project manager 403B for the ABC Project 1.0; whereas, Michael Swayne 404K is assigned as the project manager 403B for the ABC Project 1.1. In a further example, Luke Johnson 404F is assigned to development 403F for the ABC Project 1.0; whereas, Bill Garison 404L is assigned to development 403F for the ABC Project 1.1. Additionally, semantic graph 401C highlights the entities (e.g., processes) that were only used in one of the selected projects. For instance, the Translation Verification Test (TVT), represented by node 403C, was only used in the ABC Project 1.0 and the National Language Support (NLS), represented by node 403I, was only used in the ABC Project 1.1. Semantic graphs 401A-401C may collectively or individually be referred to as semantic graphs 401 or semantic graph 401, respectively.

In this manner, a user is able to quickly identify the difference processes and personnel involved in the different versions of the project. The user will be able to obtain documents and contact the appropriate personnel using semantic graph 401, such as semantic graph 401C, in an efficient manner as discussed further below.

In step 305, computer system 100 determines whether it receives an indication that a cursor is hovering over a node 403 in semantic graph 401, such as semantic graph 401C, that is associated with a person entity. If the user is placing a cursor that hovers over a node 403 in semantic graph 401, such as semantic graph 401C, where the node is associated with a person entity, then, in step 306, multi-dimensional social component 204 displays the various social actions that may occur, such as the available social communication channels and communities as illustrated in FIG. 5. FIG. 5 illustrates displaying available communication channels and social communities in response to receiving an indication that a cursor is hovering over a node in the semantic graph that is associated with a person entity in accordance with an embodiment of the present invention. Referring to FIG. 5, a listing of communication channels 501 and communities 502 for communicating with the personnel involved as project manager 403B when a cursor 503 hovers over node 403 (e.g., node 403B). Example communication channels 501 include online chat, e-mail, telephone and setting up a meeting. Example communities 502 include networks (e.g., "diversity network"), blogs and boards (e.g., "architecture board"). As further illustrated in FIG. 5, when the user selects a particular communication channel 501 or community 502, the user may be presented with a sub-menu 504 of options, such as communicating with all the individuals involved in the project or particular individuals involved in particular processes of the project. Such information displayed in sub-menu 504 is populated by smart inference component 203 as discussed above. In this manner, a user is able to efficiently communicate with the appropriate personnel concerning the project in question via various social communication channels/communities. In one embodiment, the particular communication channels and social communities that are displayed are based on the communication channels and social communities that are available to the user in question. Such a feature may be referred to as the "smart inferencing function" whereby smart inference component 203 determines the communication channels and social communities that are available to the user in question based on various factors, such as the type of node 403 cursor 503 is hovering over, the surrounding nodes 403 in semantic graph 401, and the node level (discussed further below in connection with steps 310, 311) the user is presently viewing in semantic graph 401.

Returning to FIG. 3A, in conjunction with FIGS. 1-2, 4A-4B and 5, if, however, computer system 100 does not receive an indication that a cursor is hovering over a node 403 in semantic graph 401C that is associated with a person entity, then, in step 307, computer system 100 determines whether it receives an indication that a cursor is hovering over a node 403 in semantic graph 401 that is associated with a document entity. If the user is placing a cursor that hovers over a node 403 in semantic graph 401, such as semantic graph 401C, where the node is associated with a document entity, then, in step 308, multi-dimensional social component 204 displays the displays the various social actions that may occur, such as the available communities and asset repositories (e.g., e-mail document owner, telephone document owner, meetings with document owner, post document to a community, share document with other personnel involved in project) that may be used to obtain, share, post, etc. documents associated with the document entity. In connection with such social actions, such as sharing, posting, etc., the user may be presented with a sub-menu of options as to the individuals in the project who are to be involved in such social interactions, such as discussed above in connection with sub-menu 504 of FIG. 5, where such information is populated by smart inference component 203 as discussed above. For example, documents may be shared with all the individuals involved in the project or just the individuals associated with the System Verification Test (SVT) 403E. In this manner, a user is able to share, retrieve, etc. appropriate documents and/or communicate with the authors of the appropriate documents concerning the project in question in an efficient manner via various community and asset repositories.

If, however, computer system 100 does not receive an indication that a cursor is hovering over a node 403 in semantic graph 401 that is associated with a document entity, then, referring to FIG. 3B, in conjunction with FIGS. 1-2, 4A-4B and 5, in step 309, computer system 100 determines whether it receives an indication that a cursor is hovering over an identifier 404 of a person associated with a node 403 in semantic graph 401, such as semantic graph 401C. If computer system 100 receives an indication that the user is placing a cursor that hovers over an identifier of a person 404 in semantic graph 401, such as semantic graph 401C, then, multi-dimensional social component 204 displays the various social actions that may occur, such as the available social communication channels and communities, in step 306. An illustration of the various social actions that may be displayed when the cursor hovers over an identifier of a person 404 is provided in FIG. 6.

FIG. 6 illustrates displaying available communication channels and social communities in response to receiving an indication that a cursor is hovering over an identifier 404 of a person associated with a node 403 in semantic graph 401C in accordance with an embodiment of the present invention.

Referring to FIG. 6, a listing of communication channels 601 and communities 602 for communicating with various personnel, where a cursor 603 hovers over the identifier 404K for Michael Swayne. As illustrated in FIG. 6, example communication channels 601 include online chat, e-mail, telephone and setting up a meeting. Example communities 602 include networks (e.g., "diversity network"), blogs and boards (e.g., "architecture board"). As further illustrated in FIG. 6, when the user selects a particular communication channel 601 or community 602, such as the blogs, the user may be presented with a sub-menu 604 of options, such as posting to the community or pulling user posting. Pulling user postings refers to retrieving all postings made by an individual (e.g., Michael Swayne) or group. To be clear, such postings do not necessarily have to be made by the individual whose identifier 404 (e.g., identifier 404K) has cursor 603 hovering over it. In one embodiment, smart inference component 203 determines who can pull user postings based on the particular user that selected to pull user postings as well as the entity (e.g., project manager) associated with the individual (e.g., Michael Swayne) whose identifier 404 (e.g., identifier 404K) has cursor 603 hovering over it. Posting to the community refers to publishing, such as articles, to a social community. These articles may be written by any individual, including the individual (e.g., Michael Swayne) whose identifier 404 (e.g., identifier 404K) has cursor 603 hovering over it. In one embodiment, smart inference component 203 may determine who has the ability to post to a community based on the particular user that selected to post to the community as well as the entity (e.g., project manager) associated with the individual (e.g., Michael Swayne) whose identifier 404 (e.g., identifier 404K) has cursor 603 hovering over it. In this manner, a user is able to efficiently communicate with the appropriate personnel as well as retrieve/post documents written by the appropriate personnel concerning the project in question via various social communication channels/communities.

If, however, computer system 100 does not receive an indication that a cursor is hovering over an identifier 404 of a person associated with a node 403 in semantic graph 401, then, in step 310, a determination is made by computer system 100 as to whether it receives an indication to retrieve hierarchy information across the graph's entity organization. That is, computer system 100 determines whether the user desires to retrieve organization hierarchy information for personnel depicted in semantic graph 401. If computer system 100 receives an indication to retrieve hierarchy information for personnel depicted in semantic graph 401, then, in step 311, multi-dimensional social component 204 generates an updated semantic graph illustrating the organization hierarchy, such as illustrated in FIG. 7.

FIG. 7 illustrates retrieving hierarchical information concerning the personnel depicted in semantic graph 401C to generate an updated semantic graph 701 in accordance with an embodiment of the present invention. Referring to FIG. 7, a user may be able to inform computer system 100 to retrieve organization hierarchy information via the use of a slider 702. In the example of FIG. 7, the user has indicated computer system 100 to generate updated semantic graph 701 that shows two (2) levels higher in the organization hierarchy versus what was previously depicted in semantic graph 401C, as shown in FIGS. 4A-4B and 5-6. As illustrated in FIG. 7, updated semantic graph 701 now shows that Jim Burton 404J and Mary Smith 404A report to David Sam 703, who is two levels higher than Jim Burton 404J and Mary Smith 404A in the organization, such as being the manager in charge, of Q-plan 403A. Similarly, updated semantic graph 701 now shows that Marion Shaw 404H reports to David Sam 703, who is two levels higher than Marion Shaw 404H, such as being the manager in charge, of Q-cert 403H. While FIG. 7 illustrates upward chain personnel, the principles of the present invention apply to generating updated semantic graphs that depict downward chain personnel. In this manner, a user may be able to visualize the organization hierarchy along with the project assets and relationships of the personnel to those assets. Furthermore, while FIG. 7 illustrates the use of slider 702 to retrieve organization hierarchy information, organization hierarchy information may be retrieved using other means.

Returning to FIG. 3B, in conjunction with FIGS. 1-2, 4A-4B and 5-7, if computer system 100 did not receive an indication to retrieve hierarchy information across the graph's entity organization, then, in step 312, a determination is made by computer system 100 as to whether it receives an indication that the user selected a node 404 in semantic graph 401, such as semantic graph 401C. In one embodiment, such an indication may be provided by a mouse click. If computer system 100 receives an indication that the user selected a node 404 in semantic graph 401, then, in step 313, social graph navigator 205 retrieves pertinent information pertaining to the entity associated with the selected node 404, such as by accessing a database storing templates, documents, etc., pertaining to the entity associated with the selected node 404. For example, if the user selected node 403D associated with the entity of the Function Verification Test (FVT) process, as depicted in FIGS. 4A-4B, then social graph navigator 205 may retrieve information involved with the FVT process, such as who is responsible for FVT testing, the test results, defects, overall FVT progress, etc. Such information (processes, personnel, etc.) may then be displayed as nodes 404 that surround the selected node 404 (FVT process) which becomes the new central node in an updated semantic graph 401.

In step 314, social graph navigator 205 generates an updated semantic graph 401 with the selected node 404 being the new center node and with the surrounding nodes 404 related to the processes and personnel of the selected node 404 based on the retrieved information. In this manner, the user is able to obtain more detailed information about a particular entity (process or personnel) concerning the project in question in a format that is easy to understand. For example, the user will be able to visualize the assets involved in connection with the entity (process or personnel) involved with the selected node 404 (e.g., FVT process).

If, however, computer system 100 did not receive an indication that the user selected a node 404 in semantic graph 401, then, in step 315, computer system 100 determines whether it receives an indication from the user to generate a summary report on the semantic graph(s) 401 that were viewed by the user, including updated semantic graphs, such as semantic graph 701. If computer system 100 receives an indication from the user, such as a user clicking on an option to generate a summary report (e.g., option displayed on a graphical user interface of computer system 100) via mouse 113, then, in step 316, computer system 100 generates a summary report on semantic graph(s) 401, where such a summary report may include information that the user may have forgotten during the user's navigation.

If, however, computer system 100 did not receive an indication from the user to generate a summary report on the semantic graph(s) 401 that were viewed by the user, then computer system 100 determines whether it receives an indication that a cursor is hovering over a node 403 in semantic graph 401, such as semantic graph 401C, that is associated with a person entity in step 305.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for intelligently and efficiently connecting with people and assets involved in projects, the method comprising:
    generating a first semantic graph for a first project based on resources within said first project, wherein said first semantic graph builds a relationship among entities of said first project;
    generating a second semantic graph for a second project based on resources within said second project, wherein said second semantic graph builds a relationship among entities of said second project, wherein said second project is a different project from said first project or a different version of said first project;
    receiving a selection of said first and said second semantic graphs representing different projects or versions of a same project;
    comparing and merging differences between said first and said second semantic graphs; and
    generating, by a processor, a third semantic graph that illustrates said differences between said first and said second semantic graphs, wherein said third semantic graph comprises nodes representing said entities of said first and said second projects, wherein said differences comprise one or more of the following: personnel and development processes.

2. The method as recited in claim 1, wherein one or more of said nodes represent a person entity or a document entity.

3. The method as recited in claim 1 further comprising:
    displaying available communication channels and social communities in response to receiving an indication that a cursor is hovering over a node in said third semantic graph.

4. The method as recited in claim 1 further comprising:
    displaying available communities and asset repositories in response to receiving an indication that a cursor is hovering over a node in said third semantic graph.

5. The method as recited in claim 1 further comprising:
    displaying available communication channels and social communities in response to receiving an indication that a cursor is hovering over an identifier of a person associated with a node in said third semantic graph.

6. The method as recited in claim 1 further comprising:
    generating a fourth semantic graph illustrating an organizational hierarchy in response to receiving an indication to retrieve hierarchy information for personnel depicted in said third semantic graph.

7. The method as recited in claim 1 further comprising:
    generating a fourth semantic graph in response to receiving a selection of a node of said third semantic graph, wherein said selected node becomes a center node of said fourth semantic graph, wherein said fourth semantic graph comprises nodes surrounding said center node representing personnel and development processes concerning an entity represented by said center node.

8. The method as recited in claim 1 further comprising:
    generating a summary report on one or more of said first, second and third semantic graphs.

* * * * *